(No Model.) 2 Sheets—Sheet 1.
O. C. MURPHY & P. J. MITCHELL.
STALK CUTTER.
No. 420,581. Patented Feb. 4, 1890.
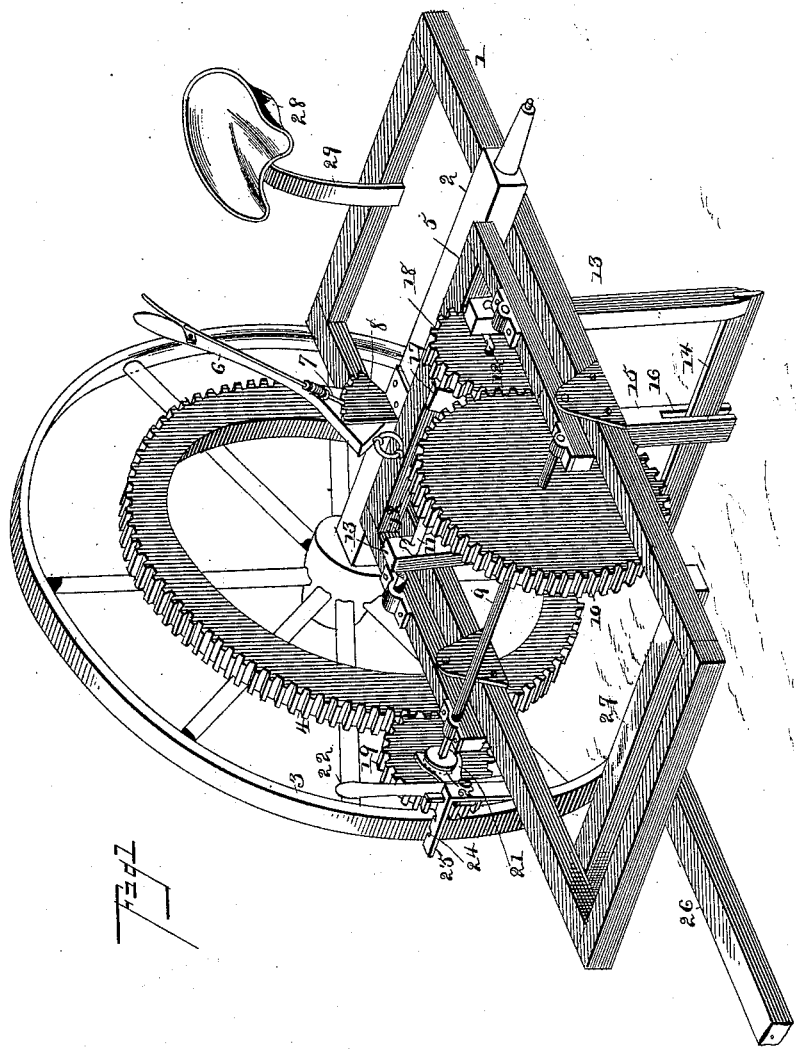
Witnesses
John Smith
Wm. Bagger
By their Attorneys,
C. A. Snow & Co.
Inventors
Oscar C. Murphy
Pleasant J. Mitchell

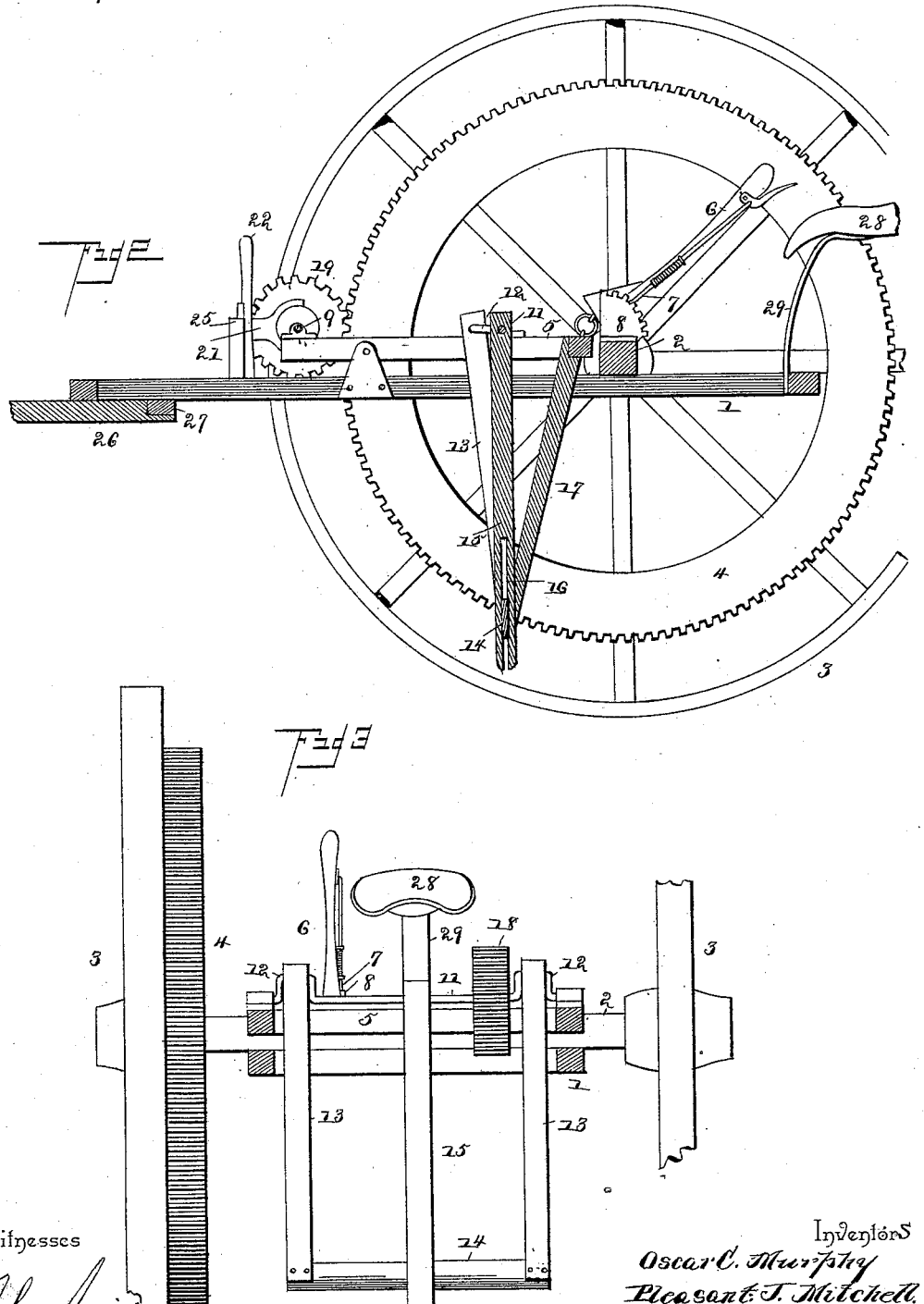

UNITED STATES PATENT OFFICE.

OSCAR C. MURPHY AND PLEASANT J. MITCHELL, OF JANESVILLE, IOWA.

STALK-CUTTER.

SPECIFICATION forming part of Letters Patent No. 420,581, dated February 4, 1890.

Application filed July 22, 1889. Serial No. 318,235. (No model.)

*To all whom it may concern:*

Be it known that we, OSCAR C. MURPHY and PLEASANT J. MITCHELL, citizens of the United States, residing at Janesville, in the county of Black Hawk and State of Iowa, have invented a new and useful Stalk-Cutter, of which the following is a specification.

This invention relates to stalk-cutters or devices for chopping cornstalks and the like while lying on the ground into pieces of suitable length, which may be conveniently turned under by the plow; and it has for its object to construct a machine of this class which shall be simple, compact, and durable, and in which the cutting or chopping mechanism shall be separate from the axle, thereby enabling the machine to be operated without serious shaking or vibration, which will be liable to impede the motion and incommode the operator.

With these ends in view the invention consists in the improved construction, arrangement, and combination of parts, which will be hereinafter fully described, and particularly pointed out in the claims.

In the drawings hereto annexed, Figure 1 is a perspective view of our improved stalk-cutter. Fig. 2 is a longitudinal vertical sectional view of the same. Fig. 3 is a vertical transverse sectional view.

Like numerals of reference indicate like parts in all the figures.

1 designates a rectangular frame, which is secured to the under side of an axle 2, on the spindle of which the wheels 3 3 are journaled. To the inner side of one of the said supporting-wheels is secured a spur-wheel 4.

5 designates the frame, which is hinged to the upper side of the frame 1 in front of the axle. The rear end of said frame is suitably connected with the lower end of a lever 6, which is mounted pivotally upon the axle, and which may be operated so as to raise or lower the rear end of the frame 5, which latter may be retained in any position to which it may be adjusted by means of a latch 7 upon the lever 6 engaging a toothed segmental plate 8, which is mounted upon the axle 2 and which forms one of the bearings of lever 6.

The front end of the frame 5 is provided with bearings for a transverse shaft 9, upon which a gear-wheel 10 is secured at a point near one side of the frame. Near the rear end of the frame 5 are bearings for a crank-shaft 11, having two cranks 12 12, one near each end. Upon said cranks are mounted the upper ends or arms 13, the lower ends of which are connected by the transverse knife or cutter 14, which is secured firmly to the said arms by means of bolts or like fastening devices. Centrally upon the crank-shaft 11 is journaled a downwardly-extending arm 15, the lower end of which is provided with a transverse slot 16, which serves to guide the knife or cutter 14 when the latter in operation is reciprocated vertically. The arm 16 is connected with the rear end of the frame 5 by means of a brace 17, which serves to hold the said arm securely in position.

The crank-shaft 11 is provided with a pinion 18, meshing with the spur-wheel 10 upon the shaft 9. One end of the latter projects in front of the spur-wheel 4 and is made square or polygonal in cross-section to receive the laterally-sliding pinion 19, which is adapted to mesh with said spur-gear. The pinion 19 has an annular groove 20, engaged by a clutch 21, which is attached to a lever 22, pivoted to a bracket 23, which extends from the side of the frame 1. The upper end of the lever 22 may be made to engage any one of a series of notches 24, formed in a bracket 25, which is secured to the frame 1, and the said lever and the pinion 19 may thereby be retained securely in any position to which they may be adjusted.

The tongue 26, for the attachment of the draft, is secured to the front end of the frame 1 and to a cross-bar 27, near the front end of the latter. The driver's seat 28 may be attached to a spring-bar 29, secured to the rear end of the frame 1.

In operation the rear end of the frame 5, carrying the cutting mechanism, is capable of vertical adjustment by the lever 6, so as to regulate the distance to which the knife or cutter 14 shall be allowed to penetrate into the ground. The pinion 19 upon the transverse shaft 9 may be adjusted by the lever 22 so as to be in or out of gear with the spur-wheel 4. When the machine is to be transported over the ground, the pinion 19 is thrown out of operation and the rear end of the frame 5, with the cutting mechanism, is elevated, so as to enable the transverse knife or cutter to pass clear of obstructions in the road. When the pinion 19 is in engagement with the spur-wheel 4, a rapid rotary motion will be imparted to the shaft 9, and thence, through the gear-wheel 10 and pinion 18, to the crank-shaft 11, by means of which the arms 13, carrying the knife or cutter 14, will be reciprocated vertically, thus causing the cutter 14 to cut or chop the stalks into short pieces, which may be easily turned under by the plow.

Having thus described our invention, what we claim, and desire to secure by Letters Patent, is—

1. The combination of the supporting-frame mounted upon the transporting-wheels, a frame hinged to the upper side of the supporting frame, a crank-shaft mounted transversely upon the said hinged frame, arms journaled upon the cranks of the said shaft and having a transverse knife or cutter secured to their lower ends, a guide-arm mounted upon the transverse crank-shaft, having a slot at its lower end to receive the vertically-reciprocating cutter, and a brace connecting the said guide-arm with the rear end of the hinged frame, substantially as set forth.

2. The combination of the supporting-frame, the frame hinged upon the latter, the crank-shaft mounted upon the hinged frame and having arms connected at the lower ends by a knife or cutter, a slotted guide-arm mounted upon the crank-shaft, a brace connecting said guide-arm with the rear end of the hinged frame, an adjusting-lever mounted upon the axle of the supporting-frame and connected with the rear end of the hinged frame, and mechanism for transmitting motion to the vertically-reciprocating cutter from one of the supporting-wheels of the machine, substantially as and for the purpose set forth.

3. The combination of the supporting-frame, the axle having the supporting-wheels, one of which is provided with a spur-gear on its inner side, the frame hinged upon the supporting-frame, a transverse shaft at the front end of the hinged frame, having a laterally-adjustable pinion adapted to engage the spur-gear of the transporting-wheel, a transverse crank-shaft at the rear end of the hinged frame, a pinion upon said crank-shaft meshing with a spur-wheel upon the shaft at the front end of the hinged frame, arms mounted upon the arms of the crank-shaft, a knife or cutter connecting the lower ends of said arms, an arm journaled upon the crank-shaft and having a guide-slot at its lower end, a brace connecting said guide-arm with the rear end of the hinged frame, and a lever for vertically adjusting the rear end of the said hinged frame, substantially as and for the purpose set forth.

In testimony that we claim the foregoing as our own we have hereto affixed our signatures in presence of two witnesses.

OSCAR C. MURPHY.
PLEASANT J. MITCHELL.

Witnesses:
HARRISON JORDAN,
JACOB MILLER.